United States Patent [19]

Magid

[11] Patent Number: 5,001,623
[45] Date of Patent: Mar. 19, 1991

[54] AUTOMATICALLY SWITCHING MULTIPLE INPUT VOLTAGE POWER SUPPLY

[75] Inventor: Bruce D. Magid, Lancaster, Pa.

[73] Assignee: Burle Technologies, Inc., Wilmington, Del.

[21] Appl. No.: 455,612

[22] Filed: Dec. 22, 1989

[51] Int. Cl.⁵ .................... H02M 3/335; H02M 7/04
[52] U.S. Cl. ............................ 363/143; 363/53; 307/48; 307/66; 307/130; 361/90; 323/346
[58] Field of Search ............ 363/126, 142, 143, 52–53; 307/44, 48, 64, 66, 71, 85–87, 130; 361/88, 90, 91, 92; 323/255, 346

[56] References Cited

U.S. PATENT DOCUMENTS

| | | | |
|---|---|---|---|
| 2,830,253 | 4/1958 | Sleeper, Jr. | 323/301 |
| 3,130,328 | 4/1964 | Moore | 307/130 |
| 3,846,695 | 11/1974 | Genuit et al. | 307/71 |
| 3,921,053 | 11/1975 | Hekimian | 363/126 |
| 4,415,964 | 11/1983 | Scharfe, Jr. | 363/142 |
| 4,441,149 | 4/1984 | Hase | 323/346 |
| 4,468,571 | 8/1984 | Heavey et al. | 307/66 |
| 4,540,892 | 9/1985 | Carvalho | 307/130 |
| 4,568,877 | 2/1986 | Tinsley | 323/266 |
| 4,608,498 | 8/1986 | Falzarano | 307/130 |
| 4,686,616 | 8/1987 | Williamson | 363/143 |
| 4,780,805 | 10/1988 | Chewuk et al. | 361/90 |

*Primary Examiner*—Peter S. Wong
*Attorney, Agent, or Firm*—Martin Fruitman

[57] ABSTRACT

A power supply which automatically adapts to different input power sources. A double pole, double throw, latching relay switches the primaries of the rectifier transformer to a series or to a parallel configuration depending upon the output voltage of the rectifier, thus adapting the circuit to either a nominal 220 VAC source or a nominal 120 VAC source. The control circuit also derives power from the rectifier transformer and is designed to operate even under the worst possible undervoltage or overvoltage conditions. The additional choice of 24 VDC power is available by the use of a diode OR circuit. When a 24 VDC source is connected to the DC input, it is also connected to the rectifier output through a diode, so that power is furnished to the load by whichever source has the higher voltage. In this configuration, a battery pack can be connected to the DC input to supply automatic backup power.

9 Claims, 1 Drawing Sheet

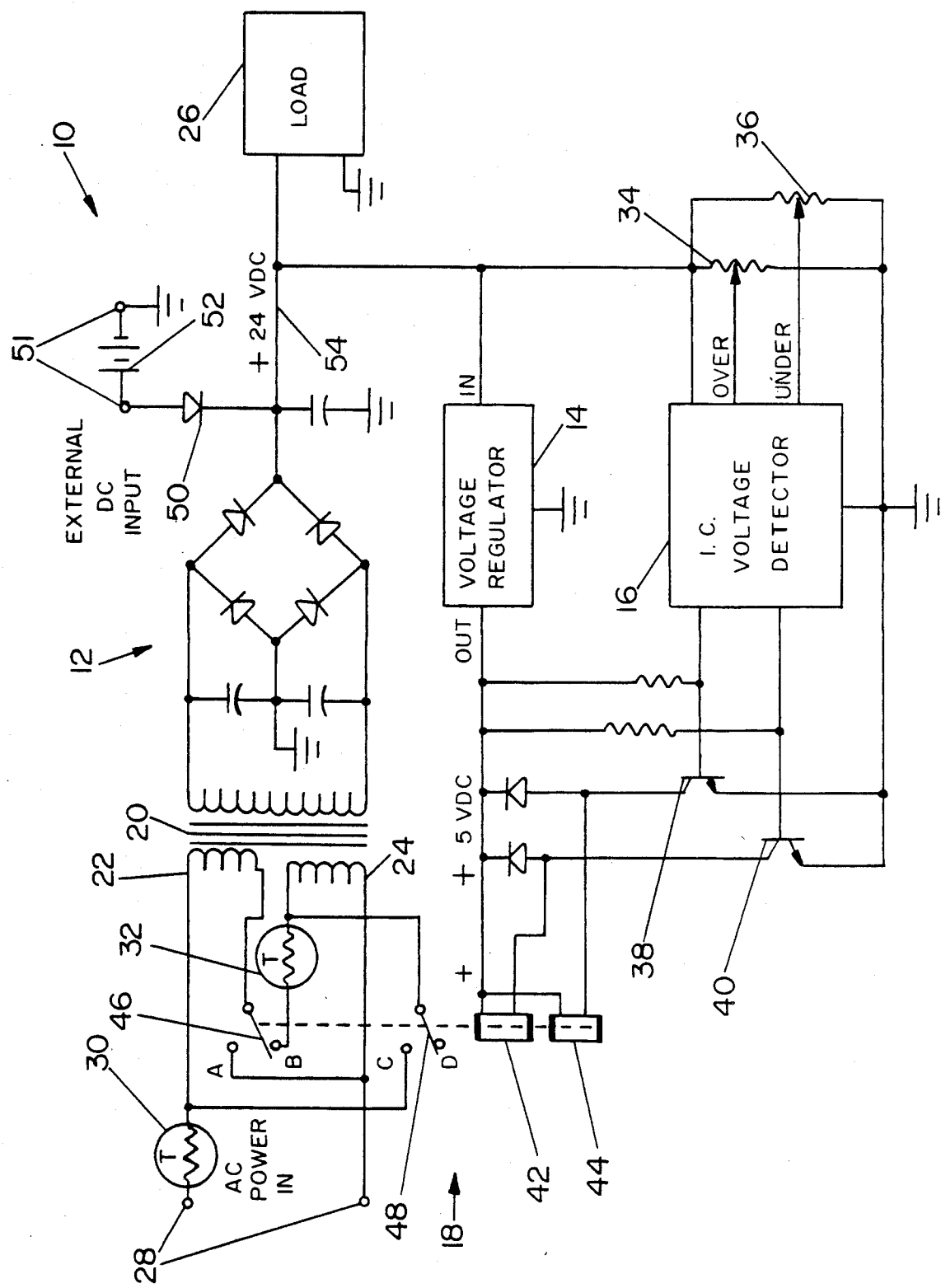

AUTOMATICALLY SWITCHING MULTIPLE INPUT VOLTAGE POWER SUPPLY

SUMMARY OF THE INVENTION

This invention deals generally with electrical interconnection systems, and more specifically with condition responsive switching systems.

In a world wide economy, one of the problems confronting the equipment designer and user is the wide variety of electrical sources for powering electronic equipment. If a piece of equipment is used with the wrong power source, the likely result is damage to the sensitive portions of the equipment. Nevertheless, there can be no guarantee that the ultimate equipment user will not make an error in hooking up the equipment, or for that matter, the ultimate user will even be able to read the language in which the instructions are written. This leaves the burden of meeting the requirement of multiple power sources on the designer rather than the user. The actual goal of most multiple power source equipment has been for the equipment itself to determine the power source and to adapt to it.

The result has been the patenting of several circuits which sense the input power voltage and use relays to switch transformer primaries to match the applied voltage. These circuits serve the basic need by distinguishing normal 120 VAC from nominal 220 VAC, but they were apparently designed by people sitting in sophisticated, fully implemented laboratories, who never tried to use the resulting designs in the field.

In the real world, the nominal power source voltages are seldom what they are supposed to be. Even in developed countries, there is a wide variation in the actual voltage available from a nominal source voltage, but in locations where the power generation and distribution systems are less developed, the actual voltage available at the typical source is virtually unpredictable. Nominal voltages can vary so much that a nominal 120 VAC source which is running high may be difficult to distinguish from a nominal 220 VAC source which is running low. Moreover, the extremes of either nominal voltage may damage circuits for which a wide input voltage variation was not anticipated.

The present invention therefore attacks the problem from a different approach. Rather than monitoring and measuring the power input voltage, the present invention monitors the DC power supply output voltage and changes the input circuit to yield the DC power supply output voltage which is required to properly operate the connected load circuits. Furthermore, the present invention uses only a single transformer to supply both the power for the load circuit to which power is being furnished, and also to supply the power to operate its own internal control circuit.

The invention also includes a circuit which permits automatic and instantaneous changeover to an external DC battery pack if the AC power source does not produce sufficient voltage.

The basic component of the invention is a transformer with a dual primary winding and a magnetic design which permits it to operate over wide voltage and frequency ranges. In the preferred embodiment, this transformer has two primary windings, rated at 85 to 155 VAC at 40 to 70 Hz when connected in parallel, and 170 to 310 VAC at 40 to 70 Hz when connected in series. The transformer voltage ratio is designed so that, even under the worst possible undervoltage condition, it will still produce sufficient voltage to power the control circuit.

A double pole, double throw, latching relay is used to switch the transformer primary windings to the series or parallel connection depending upon the control signal the relay receives. Since the relay is a latching relay, it dissipates power only during the corrective action, starting when an overvoltage or an undervoltage is sensed and lasting until the circuit has corrected the condition.

In the preferred embodiment the sensor for undervoltage and overvoltage is an integrated circuit voltage detector circuit. This detector circuit monitors the voltage at the output of the DC rectifier circuit and produces an appropriate signal to operate the latching relay. If the DC voltage rises above a predetermined maximum level, the detector circuit powers one of the latching relay coils, which places the transformer primary windings in series. If the DC voltage level falls below a predetermined minimum level, the detector circuit powers the other relay coil to switch the transformer primary windings to parallel connections. Two manual controls are available in the preferred embodiment to permit setting the undervoltage and overvoltage changeover points.

The invention also permits automatic switching of the load circuit directly to external DC power. This is accomplished by interconnecting the DC power input to the output of the internal DC power supply through a diode to create an OR function. The load will then use power from either the output of the internal DC power supply or from the external DC power source, depending upon which of the two voltages is higher. By designing the internal DC power supply to yield a voltage slightly higher than the external DC supply, the external DC power can be fed from a battery pack, and the battery power is then used only as a backup power source. One benefit of such a configuration is that the battery pack is switched in automatically and instantaneously when required, with no interruption of power to the load. Moreover, when the voltage from the internal DC power supply is reestablished, the load automatically switches back to that power source, so that short term power outages have no effect on the load.

The present invention will therefore monitor its own output voltage, and automatically adapt itself to work properly with any power source available. Thus, the invention eliminates the need for separate product models to be used with different line voltages or frequencies, and it also prevents the need to rely on the user to convert a product to a different input power when the user changes power sources.

BRIEF DESCRIPTION OF THE DRAWING

The FIGURE is an electrical schematic diagram of the preferred embodiment of the invention.

DETAILED DESCRIPTION OF THE INVENTION

The preferred embodiment of the invention is shown in the FIGURE as a simplified electrical schematic diagram, in which automatically switching power supply 10 is constructed essentially of DC rectifier 12, voltage regulator circuit 14, integrated circuit voltage detector circuit 16 and latching relay 18.

DC rectifier 12 is a conventional circuit, and although shown as a bridge rectifier circuit in the preferred embodiment, could be any configuration of a DC rectifier circuit. AC power transformer 20 is, however, specifically designed to function in the invention. Transformer 20 is constructed with two independent primary windings, 22 and 24. Moreover transformer 20 is designed to operate over a wide range of frequencies and voltages. While such a transformer is well within the state of current technology and can be designed by one skilled in the transformer art, it is important to select transformer 20 with the proper characteristics in order to secure the benefits of the invention.

Primary windings 22 and 24 of transformer should each be rated for operation on the lower of two alternative AC voltages from which automatically switching power supply 10 is to derive power, and they must be capable of operating when the AC power input voltage varies greatly from its nominal voltage. In the preferred embodiment, the rating of each primary winding is 120 VAC − 35 VAC. Thus, the windings are capable of functioning with a 30 percent variation from their nominal voltage rating, whether that variation is above or below the nominal rating.

Transformer 20 is also constructed so that it will operate properly within a wide range of input power frequencies. In the preferred embodiment transformer 20 is rated for operation between 40 and 70 Hz. This range can be expected to account for most available power sources and the anticipated frequency variations from those sources.

The turns ratio of transformer 20 is selected to assure that even under the worst undervoltage conditions there will always be sufficient voltage to operate the control functions of switching power supply 10. In the preferred embodiment, where load 26 operates on 24 VDC, and therefore IC voltage detector 16 and voltage regulator 14, which powers latching relay 18 also operate from the same voltage, this requires that the output of voltage regulator 14 never fall below its regulated 5 VDC under the worst condition. The worst anticipated undervoltage condition in the circuit of the invention is when, for the short time period during switching, AC power input 28 has only 85 VAC (nominal 120 volts less 30%) applied while transformer 20 is still connected with primary windings 22 and 24 in series because of an immediately preceding high input voltage.

The turns ratio of transformer 20 is therefore chosen so that, considering the characteristics of voltage regulator 14, voltage regulator 14 yields a 5 VDC on its output when AC power input 28 has only 85 VAC applied while transformer windings 22 and 24 are in series. Actually, it is voltage regulator 14, through its regulating action, which provides most of the accommodation to this extreme condition by providing its regulated output voltage over a range of input voltages of almost three to one.

At the other extreme, when an overvoltage is applied to AC power input 28, because power supply 10 is just about to switch the transformer primaries to a series connection because the maximum allowable voltage (240 VAC + 30%) has been applied, the accommodation to the overvoltage is essentially supplied by overvoltage protection thermistors 30 and 32. Thermistors 30 and 32 are placed in series with transformer primary windings 22 and 24, respectively, and prevent these windings from being subjected to voltages too far in excess of their nominal ratings. This protects not only the transformer primary windings, but also limits the voltage generated on the transformer secondary and thus protects the rest of the circuit. This protection is effective when overvoltages are applied for long periods of time during normal operation. In effect, thermistors 30 and 32 limit the AC power voltage applied to automatically switching power supply 10 to the maximum voltage which is permitted to be applied to the primary of transformer 20, regardless of which configuration the primary windings are in. This overload protection automatically resets when the overvoltage condition is removed.

The switching action of power supply 10 is controlled by IC voltage detector 16 which is a conventional device. It i connected to the output of rectifier circuit 12 by means of potentiometers 34 and 36. These potentiometers permit the adjustment of the threshold voltage levels at which voltage detector 16 will initiate the switching of the transformer primaries. Voltage detector 16 is connected to and controls transistors 38 and 40, which are connected to the two coils 42 and 44 of latching relay 18, and the transistors are the devices that actually operate the relay coils. Contacts 46 and 48 of latching relay 18 are connected to and implement the actual switching of the transformer primaries.

Diode 50 is connected from external DC input 51 to the output of rectifier circuit 12 and permits the use of battery 52 as an alternative DC source for load 26. The action of diode 50 is simple, but it is effective and automatic.

OPERATION OF THE PREFERRED EMBODIMENT

Assuming, for the purposes of explanation, that battery 52 has an output voltage of exactly 24 VDC, and, as preferred, rectifier circuit 12 is also generating exactly 24 VDC, then load 26 would draw its power from rectifier circuit 12. This is because diode 50 always has some small voltage drop across it, normally about one-half to one volt, so that, as far as the load is concerned, battery 52 can only furnish about 23 volts. However, if the output voltage of rectifier circuit 12 were to drop below 23 volts, if it were to simply turn off, as the voltage at line 54 would attempt to fall below 23 volts, diode 50 will turn on and battery 52 would prevent that from occurring by providing power to load 26. Therefore, in the present circuit, battery 52 operates not only as an alternative power supply, but as long as it is connected to DC input 51, it acts as a back up power supply as well. Nevertheless, when normal AC power input is available, battery 52 furnishes no power and is merely on standby.

In normal operation power supply 10 derives its power from an AC power source (not shown) connected to AC power input 28, and based upon the position of latching relay 18 as shown in the FIGURE, that power source should be nominally 220 VAC. As shown, relay 18 places primary windings 22 and 24 in the series connection, and if the AC input voltage is indeed 220 volts, rectifier circuit 12 will produce 24 VDC on its output line 54, to which load 26 is connected. Fulfilling the normal operation condition, voltage regulator 14 will supply 5 VDC for IC voltage detector 16, relay 18 and transistors 38 and 40. The 24 VDC supplied to the voltage dividers of which potentiometers 34 and 36 are parts will furnish voltages to the overvoltage and undervoltage sensing portions of voltage detector 16 based upon the settings of the potentionmeters. However, since the circuit is in the proper configuration for the AC power voltage applied, IC voltage detector 16 will not turn on transistors 38 and 40 and the circuit will remain in the condition described. If the AC power voltage applied were 120 volts, and relay 18 were in its other position, the result would be the same.

Returning to the condition pictured, if the voltage source were to change to, for instance, 110 VAC, then the rectifier output voltage on line 54 would decrease to approximately 12 VDC, one-half the previous voltage. In such a situation, and if there were no alternative DC battery connected to DC input 51, both potentiometers 34 and 36 would send lower voltages to IC voltage detector 16 and, assuming undervoltage potentiometer 36 were properly set, IC voltage detector 16 would receive an undervoltage signal. It would then activate the appropriate transistor and relay coil so that relay contact set 46 would switch from contact B to contact A and contact set 48 would switch from contact D to contact C. This action places the transformer primaries in parallel, and because of the 110 VAC applied to power input 28, would reestablish 24 VDC on the load, and also reestablish the neutral condition on the voltage sensing circuitry to maintain the condition.

In a similar manner, an overvoltage indicated at potentiometer 34 because too high a voltage is applied to the parallel arrangement on the transformer primaries, causes relay 18 to switch in the opposite direction and connect the transformer primaries in series.

The present invention therefore supplies a very versatile power supply for DC loads. It can operate on two voltages, one of which is approximately one-half the other, and it accepts as a third power source another DC supply of the same nominal voltage that it produces. Moreover it switches between these various sources automatically, with no action on the part of the operator, and still it is self protecting and also protects the load in regard to overvoltages.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention a defined in the following claims.

For example, the specific voltages discussed in regard to the preferred embodiment can be varied, and the particular manner in which overvoltage and undervoltage are sensed could be changed. Moreover, a different means for controlling the relay which switches the transformer primaries may also be used.

What is claimed as new and for which Letters Patent of the United States are desired to be secured is:

1. An automatically switching DC power supply comprising:
   an AC input voltage connection;
   a transformer with two primary windings rated for the same AC input voltage and with a secondary winding;
   an overvoltage protection means interconnected with each transformer primary winding and acting to limit the voltage applied to the primary winding to which it is connected;
   a DC rectifier means connected to the transformer secondary and producing a first DC voltage on a first output connection when an AC voltage is applied to the primary windings of the transformer;
   an overvoltage sensor connected to the first output connection and producing an overvoltage signal when the first DC voltage is higher than a predetermined level;
   an undervoltage sensor connected to the first output connection and producing an undervoltage signal when the first DC voltage is lower than a predetermined level;
   relay contact means interconnected with the two transformer primary windings in such a manner that the relay contact means can switch the two primary winding between a condition in which the primary windings are in series across the AC input voltage connection and a condition in which the two primary windings ar in parallel across the AC input voltage connection; and
   relay coil means actuating the relay contact means and interconnected with and receiving signals from the overvoltage sensor and the undervoltage sensor, so that the relay contact means puts the transformer primary windings in parallel when the relay coil means receives an undervoltage signal, and the relay contact means puts the transformer primary windings in series when the relay coil means receives an overvoltage signal.

2. The automatically switching DC power supply of claim 1 further including a voltage processing means connected to and drawing power from the output connection of the DC rectifier means, and producing a second output connection from which the relay coil means receives operating power.

3. The automatically switching DC power supply of claim 1 further including a power drive means connected to and deriving its operating power from the voltage processing means, and interconnected between the relay coil means and the undervoltage sensor and the overvoltage sensor, and receiving the signals from the overvoltage sensor and the undervoltage sensors, and activating the relay coil mean according to which signal it receives.

4. The automatically switching DC power supply of claim 2 wherein the voltage processing means is a voltage regulator.

5. The automatically switching DC power supply of claim 2 wherein the voltage processing means is a voltage regulator which maintains its rated output voltage over a range of input voltages of at least three to one.

6. The automatically switching DC power supply of claim 1 further including a DC input for an alternate DC power source with the DC input connected to the first output connection through a diode.

7. The automatically switching DC power supply of claim 1 further including a DC input to which is connected an external DC power source of the same voltage rating as the output voltage rating of the DC rectifier means, with the DC input connected to the first output connection through a diode.

8. The automatically switching DC power supply of claim 1 further including variable controls connected on the inputs of the overvoltage sensor and the undervoltage sensor, the variable controls permitting the adjustment of the voltages at which the sensors produce their signals.

9. The automatically switching DC power supply of claim 1 wherein the relay contact means and the relay coil means are parts of a latching relay.

* * * * *